United States Patent
Drechsel

(10) Patent No.: US 10,480,514 B2
(45) Date of Patent: Nov. 19, 2019

(54) PUMP ARRANGEMENT AND METHOD FOR PRODUCING A CONTAINMENT SHELL FOR THE PUMP ARRANGEMENT

(71) Applicant: KSB Aktiengesellschaft, Frankenthal (DE)

(72) Inventor: Patrick Drechsel, Frankenthal (DE)

(73) Assignee: KSB Aktiengesellschaft, Frankenthal (DE)

( * ) Notice: Subject to any disclaimer, the term of this patent is extended or adjusted under 35 U.S.C. 154(b) by 503 days.

(21) Appl. No.: 14/889,680

(22) PCT Filed: May 8, 2014

(86) PCT No.: PCT/EP2014/059431
§ 371 (c)(1),
(2) Date: Nov. 6, 2015

(87) PCT Pub. No.: WO2014/180948
PCT Pub. Date: Nov. 13, 2014

(65) Prior Publication Data
US 2016/0123328 A1    May 5, 2016

(30) Foreign Application Priority Data

May 8, 2013    (DE) .................. 10 2013 208 511
May 7, 2014    (DE) .................. 10 2014 006 568

(51) Int. Cl.
*F04D 13/02*    (2006.01)
*H02K 7/108*    (2006.01)
(Continued)

(52) U.S. Cl.
CPC ........... *F04D 13/025* (2013.01); *B22D 25/02* (2013.01); *F04D 13/027* (2013.01);
(Continued)

(58) Field of Classification Search
CPC .... H02K 5/128; H02K 5/1282; H02K 5/1285; H02K 2005/1287; H02K 7/1085;
(Continued)

(56) References Cited

U.S. PATENT DOCUMENTS 4,648,808 A * 3/1987 Hauenstein ........... F04D 13/027
                                                     415/106
4,793,777 A * 12/1988 Hauenstein ......... F04D 29/0416
                                                     417/365
(Continued)

FOREIGN PATENT DOCUMENTS

DE    1653 741 A      5/1971
DE    38 34 863 A1    4/1990
(Continued)

OTHER PUBLICATIONS

International Preliminary Report on Patentability (PCT/IB/373) issued in PCT application No. PCT/EP2014/059431 dated Nov. 10, 2015, including English translation of document C2 (German-language Written Opinion (PCT/ISA/237) previously filed on Nov. 6, 2015 (Five (5) pages).

(Continued)

*Primary Examiner* — Bryan M Lettman
(74) *Attorney, Agent, or Firm* — Crowell & Moring LLP

(57) ABSTRACT

A pump arrangement, particularly a magnetic clutch pump arrangement, includes a containment can with a central longitudinal axis which hermetically seals an enclosed chamber with respect to the inner chamber formed by the pump housing. The containment can has a base with at least one bead extending into the inner chamber. The at least one bead is radially spaced from the central longitudinal axis of the containment shell by at least one defined distance relationship. A method for producing a containment can for a pump arrangement is also provided.

11 Claims, 3 Drawing Sheets

(51) Int. Cl.
*H02K 49/10* (2006.01)
*H02K 5/128* (2006.01)
*H02K 7/00* (2006.01)
*F04D 13/06* (2006.01)
*B22D 25/02* (2006.01)
*F04D 25/06* (2006.01)

(52) U.S. Cl.
CPC ......... *F04D 13/0626* (2013.01); *F04D 25/06* (2013.01); *H02K 7/003* (2013.01); *H02K 7/1085* (2013.01); *H02K 49/106* (2013.01); *H02K 2005/1287* (2013.01)

(58) Field of Classification Search
CPC ........ H02K 7/11; H02K 49/10; H02K 49/104; H02K 49/106; H02K 7/003; F04D 13/025; F04D 13/024; F04D 13/026; F04D 13/027; F04D 13/021; F04D 25/06
See application file for complete search history.

(56) References Cited

U.S. PATENT DOCUMENTS

| | | | | |
|---|---|---|---|---|
| 5,302,091 A * | 4/1994 | Horiuchi | ............ | F04D 29/0413 415/111 |
| 5,915,931 A * | 6/1999 | Lindner | ............... | H02K 49/106 417/420 |
| 6,443,710 B1 * | 9/2002 | Tatsukami | .......... | F04D 29/0413 417/365 |
| 2001/0043865 A1 * | 11/2001 | Rennett | ............... | F04D 29/0413 417/44.1 |
| 2001/0043871 A1 * | 11/2001 | Rennett | ................ | F04D 13/026 417/368 |
| 2004/0184936 A1 * | 9/2004 | Yanagihara | ........... | F04D 29/026 417/420 |
| 2005/0095149 A1 * | 5/2005 | Tanaka | .................. | F04D 13/026 417/420 |
| 2006/0288560 A1 * | 12/2006 | Shafer | .................. | H02K 49/106 29/446 |
| 2013/0170971 A1 * | 7/2013 | Mischiatti | ............... | F04D 5/002 415/204 |

FOREIGN PATENT DOCUMENTS

| | | | |
|---|---|---|---|
| DE | 91 00 515 U1 | 4/1991 | |
| DE | 9100515 | * 4/1991 | |
| DE | 19912614 A1 | 9/2000 | |
| DE | 42 38 132 C2 | 10/2002 | |
| DE | 20 2009 017 996 U1 | 12/2010 | |
| DE | 10 2011 114 191 A1 | 3/2013 | |
| WO | WO2013041161 | * 3/2013 | ............. H02K 5/128 |
| WO | WO 2013/041161 A2 | 3/2018 | |

OTHER PUBLICATIONS

International Search Report (PCT/ISA/210) issued in PCT Application No. PCT/EP2014/059431 dated Sep. 24, 2014 with English translation (five pages).

German-language Written Opinion (PCT/ISA/237) issued in PCT Application No. PCT/EP2014/059431 dated Sep. 24, 2014 (four pages).

German Search Report issued in corresponding German Application No. 10 2013 208 511.7 dated Oct. 28, 2013 with partial English translation (10 pages).

English translation of Japanese Office Action issued in counterpart Japanese Application No. 2016-512378 dated Mar. 2, 2018 (five (5) pages).

* cited by examiner

PUMP ARRANGEMENT AND METHOD FOR PRODUCING A CONTAINMENT SHELL FOR THE PUMP ARRANGEMENT

CROSS REFERENCE TO RELATED APPLICATIONS

This application is a continuation of PCT International Application No. PCT/EP2014/059431, filed May 8, 2014, which claims priority under 35 U.S.C. § 119 from German Patent Application No. 10 2013 208 511.7, filed May 8, 2013 and German Patent Application No. 10 2014 006 568.5, filed May 7, 2014, the entire disclosures of which are herein expressly incorporated by reference.

BACKGROUND AND SUMMARY OF THE INVENTION

The invention relates to a pump arrangement, in particular magnetic clutch pump arrangement.

The pump arrangement has an interior space formed by a pump casing, a containment can which has a central longitudinal axis and which hermetically seals off a chamber surrounded by said containment can with respect to the interior space formed by the pump casing, an impeller shaft which can be driven in rotation about an axis of rotation, an impeller which is arranged on one end of the impeller shaft, having an inner rotor arranged on the other end of the impeller shaft, and an outer rotor which is arranged on a drive shaft and which interacts with the inner rotor. The containment can has a base with at least one bead which projects into the chamber. The invention also relates to a method for producing a containment can of a pump arrangement.

In the case of such pumps, the rotating magnetic field induces eddy currents in the metallic containment can situated between inner rotor and outer rotor. Said statically positioned containment can, together with the casing cover and the pump casing itself, forms the pressure-bearing pump part, whereby the inner rotor, which is situated within said enclosure, is in constant contact with the delivery medium. To reduce the eddy currents and the associated continuous heating of the medium to the point of evaporation, use is firstly normally made of metallic containment can materials with high electrical resistance. Particularly expensive nickel-based alloys (Hastelloy) have become established for this purpose. Secondly, the heat losses are dissipated by way of a cooling flow. Said flow, which is branched off as a bypass from the main delivery flow, is, owing to the pressure distribution in the chamber, transported over the outer diameter of the inner rotor, in a radially inward direction between inner rotor and containment can base to the impeller shaft, and back to the main hydraulic system via a hollow bore in said impeller shaft. Owing to the rotation of the inner rotor and the resulting formation of vortices in the bypass flow of the delivery medium, an excessive pressure gradient arises between the inner rotor outer diameter and the inlet, situated coaxially with respect to the axis of rotation, of the hollow bore of the impeller shaft. The cooling flow rate and thus the heat dissipation are restricted. Integration of a geometry, which has the effect of impeding or breaking up vortices in the delivery medium, on the static containment can base can prevent or limit this, whereby the inertial rotor chamber temperature remains at a corresponding level below the vapor pressure curve of the delivery medium.

German patent document no. DE 91 00 515 U1 has disclosed a magnetic coupling pump in which it is intended to reduce the formation of swirl phenomena in the delivery medium by way of a bead provided in the base of the containment can. The pressure loading-optimized geometry or shape of the base without beads results from the expandability or deformability of the convex-ellipsoidal base under load. This is however impeded owing to the centrally provided beads, which thus have a stiffening action. This results in increased stresses in the containment can material of the bead region. In relation to convex-ellipsoidal shapes without beads, and using the same wall thicknesses or starting material thicknesses, the disclosed bead contour achieves a compressive strength of only approximately 40%. In this way, an equal compressive strength can be attained only through the use of more material, with an associated increase in costs.

It is the object of the invention to provide a pump arrangement in which the formation of vortices in the delivery medium within the containment can is further reduced, without reducing the stability of the containment can.

The object of the invention is achieved in that the at least one bead is arranged with a radial spacing to the central longitudinal axis of the containment can, wherein the ratio of inner radius of the containment can to spacing of bead outer edge and central longitudinal axis of the containment can lies in a range from 1.3 to 1.6.

The ratio of inner radius of the containment can to spacing of bead outer edge and central longitudinal axis of the containment can preferably lies in a range from 1.38 to 1.57.

The spacing of the bead inner edge to the central longitudinal axis of the containment can is advantageously $1/7 *$containment can inner radius$^Y$, wherein Y preferably lies in a range from approximately 1.14 to 1.17.

Through such a specification of the ratio of inner radius of the containment can to radius of the bead outer edge, or of the spacing of the bead inner edge to the central longitudinal axis, the axial expandability or deformability of the containment can base is maintained, whereby the pressure-withstanding capability is maintained to a degree of 90 to 95% in relation to a containment can base of the same wall thickness without beads.

In a preferred implementation of the invention, for a high compressive strength of the preferably deep-drawn or cast containment can, the base thereof is formed by a substantially spherical—segment-shaped spherical cap region and by a rim region which forms the transition region between main body and spherical cap region.

According to the invention, for an optimum spacing between inner rotor and the bead base, the bead base runs in a plane which is situated substantially parallel to the plane in which the transition from the spherical cap region to the rim region is situated. The imaginary planes lie substantially perpendicular to a central longitudinal axis of the containment can.

Here, in a particular refinement, it is provided that the inner wall of the containment can in the region of the bead base lies substantially in the same plane as the transition from the spherical cap region to the rim region.

In an alternative refinement, the bead base is formed so as to run parallel to the spherical cap region.

A good mode of operation with regard to the reduction of vortex formation is achieved if, in the region of the bead base, the maximum spacing of the inner wall of the containment can to the face side, facing toward the base of the containment can, of the inner rotor is approximately 20 mm.

It is preferable if, in the region of the bead base, the maximum spacing of the inner wall of the containment can to the face side of the inner rotor is approximately 10 mm, in order to further reduce vortex formation.

Since the mechanical stresses are at their greatest at the transition from the spherical cap region to the bead region, and sharp-edged transitions are the most effective for preventing the formation of vortices, it is provided according to the invention that the transitions between the spherical cap region and the bead walls have greater radii than the transitions from the bead walls to the respective bead base. At the same time, it is possible for the pressure acting outwardly in the chamber enclosed by the containment can to be accommodated in a particularly effective, that is to say low-stress manner.

If the at least one bead extends in a radial direction to a point close to the rim region, or extends as far as the latter, the vortices that arise in the chamber enclosed by the containment can (said vortices being most pronounced at the inner rotor in a region with the greatest circumferential speed, that is to say close to the outer diameter of the rotating inner rotor) are effectively reduced.

A method according to the invention provides that the containment can is produced by way of a deep-drawing process or by way of a casting process, wherein at least one bead is produced in the base, which bead is arranged with a radial spacing to the central longitudinal axis of the containment can.

Other objects, advantages and novel features of the present invention will become apparent from the following detailed description of one or more preferred embodiments when considered in conjunction with the accompanying drawings.

DETAILED DESCRIPTION

Figure 1:
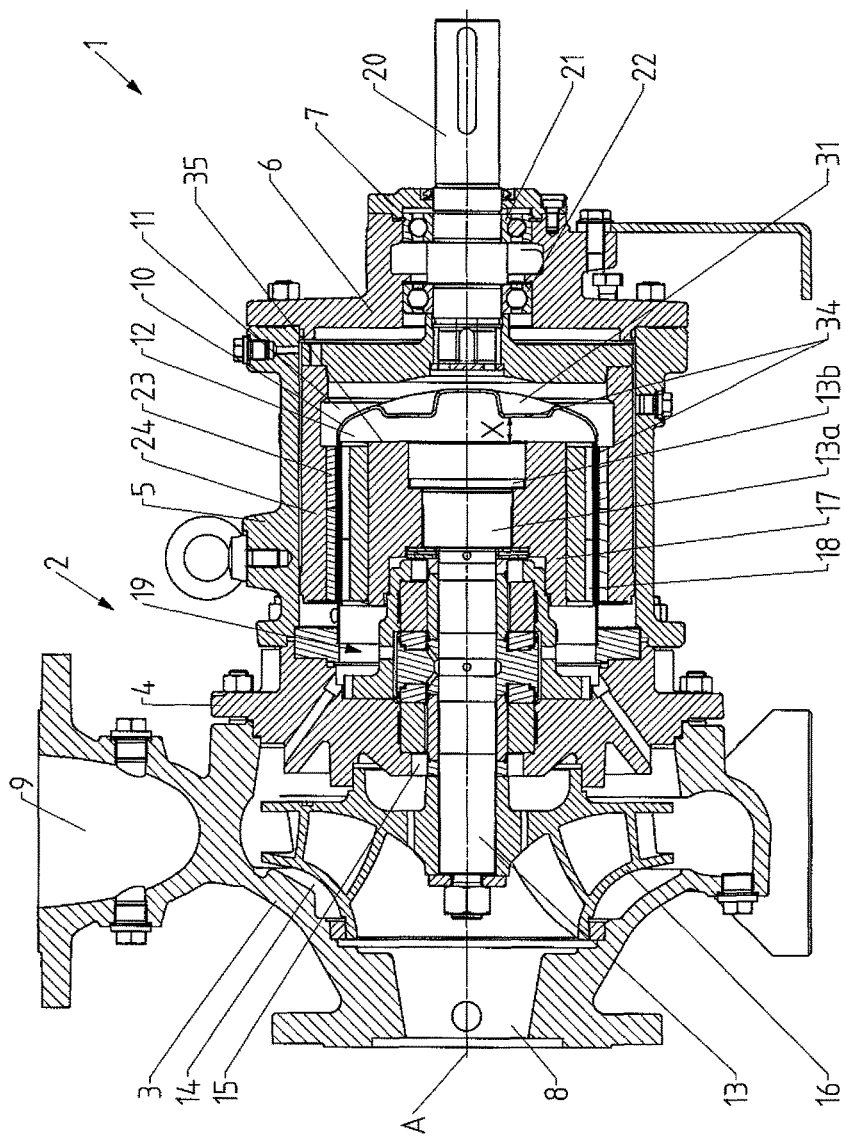
FIG. 1 shows a longitudinal section through a magnetic clutch pump arrangement having a containment can according to an embodiment of the invention, which has beads in its base.

FIG. 1 shows a pump arrangement 1 in the form of a magnetic clutch pump arrangement. The pump arrangement 1 has a multi-part pump casing 2 of a centrifugal pump, which pump casing comprises a hydraulics casing 3 in the form of a spiral casing, a casing cover 4, a bearing carrier cage 5, a bearing carrier 6 and a bearing cover 7.

The hydraulics casing 3 has an inlet opening 8 for the intake of a delivery medium and has an outlet opening 9 for the discharge of the delivery medium. The casing cover 4 is arranged on that side of the hydraulics casing 3 which is situated opposite the inlet opening 8. The bearing carrier cage 5 is fastened to that side of the casing cover 4 which is opposite from the hydraulics casing 3. The bearing carrier 6 is mounted on that side of the bearing carrier cage 5 which is situated opposite the casing cover 4. The bearing cover 7 in turn is fastened to that side of the bearing carrier 6 which is opposite from the bearing carrier cage 5.

A containment can 10, preferably produced by deep drawing or by casting, is fastened to that side of the casing cover 4 which is opposite from the hydraulics casing 3, and said containment can extends at least partially through an interior space 11 delimited by the pump casing 2, in particular by the casing cover 4, by the bearing carrier cage 5 and by the bearing carrier 6. The containment can 10 hermetically seals off a chamber 12, which is enclosed by said containment can, with respect to the interior space 11.

An impeller shaft 13 which is rotatable about an axis of rotation A extends from a flow chamber 14, which is delimited by the hydraulics casing 3 and by the casing cover 4, into the chamber 12 through an opening 15 provided in the casing cover 4.

An impeller 16 is fastened to a shaft end, situated within the flow chamber 14, of the impeller shaft 13, and an inner rotor 17 arranged within the chamber 12 is arranged on the opposite shaft end, which has two shaft sections 13a, 13b with increasing diameters in each case. The inner rotor 17 is equipped with multiple magnets 18 which are arranged on that side of the inner rotor 17 which faces toward the containment can 10.

Between the impeller 16 and the inner rotor 17 there is arranged a bearing arrangement 19 which is operatively connected to the impeller shaft 13, which can be driven in rotation about the axis of rotation A.

A drive motor, preferably an electric motor, which is not illustrated drives a drive shaft 20. The drive shaft 20, which can be driven rotatably about the axis of rotation A, is arranged substantially coaxially with the impeller shaft 13. The drive shaft 20 extends through the bearing cover 7 and through the bearing carrier 6 and is mounted in two ball bearings 21, 22 which are accommodated in the bearing carrier 6. On the free end of the drive shaft 20 there is arranged an outer rotor 24, which bears multiple magnets 23. The magnets 23 are arranged on that side of the outer rotor 24 which faces toward the containment can 10. The outer rotor 24 extends at least partially over the containment can 10 and interacts with the inner rotor 17 such that the rotating outer rotor 24, by way of magnetic forces, sets the inner rotor 17 and thus likewise the impeller shaft 13 and the impeller 16 in rotation.

Figure 2:
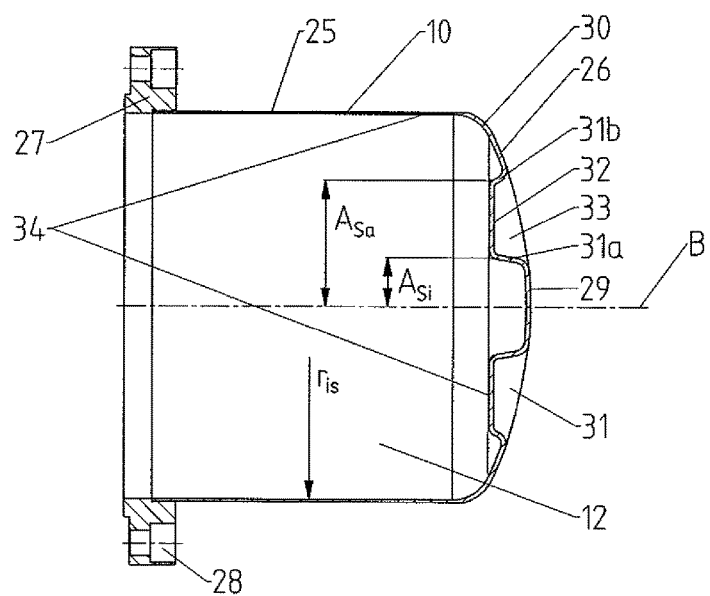
FIG. 2 shows the longitudinal section through the containment can in FIG. 1 in an enlarged illustration.
Figure 3:
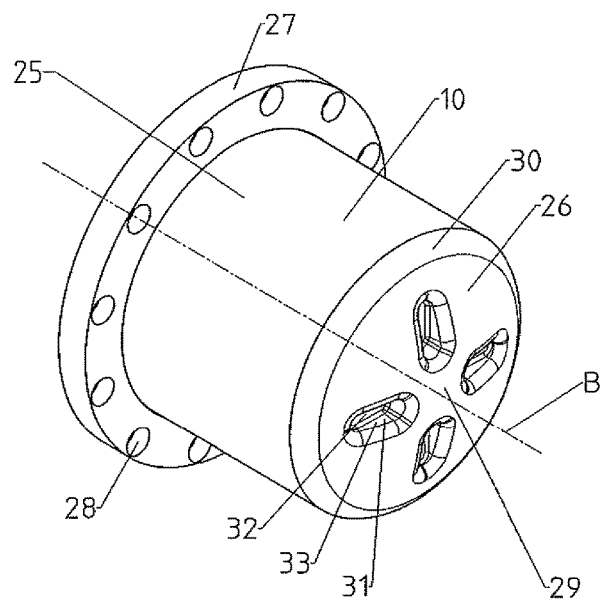
FIG. 3 is a three-dimensional illustration of the containment can in FIG. 1.

The containment can 10, illustrated on an enlarged scale in FIGS. 2 and 3, has a substantially cylindrical main body 25 with a central longitudinal axis B arranged substantially coaxially with respect to the axis of rotation A as per FIG. 1. The main body 25 is open on one side, and is closed by way of a domed base 28 on the side situated opposite the open side. On the open side, there is arranged a ring-like attachment flange 27 which is formed integrally with the main body 25 or which is connected to the latter by welding or other suitable fastening means or devices, for example screws, rivets or the like.

The attachment flange 27 has multiple bores 28 which extend parallel to the central longitudinal axis B and through which screws (not shown) can be passed and screwed into corresponding threaded bores in the casing cover 4 as per FIG. 1.

The base 26 is formed by a substantially spherical—segment-shaped spherical cap region 29 and an outer rim region 30 which forms the transition region between main body 25 and spherical cap region 29. In the spherical cap region 29 there are provided multiple beads 31 which project into the chamber 12 and which have a bead base 32 and a bead wall 33. The beads 31 have a bead inner edge 31a, arranged close to the central longitudinal axis B, and a bead outer edge 31b, arranged remote from the central longitudinal axis B. The chamber 12 has the greatest axial extent close to the central longitudinal axis B, wherein the ratio of inner radius $r_{is}$ of the containment can 10 to spacing $A_{Sa}$ of bead outer edge 31b and central longitudinal axis B of the containment can 10 lies in a range from 1.3 to 1.6, and preferably in a range from 1.38 to 1.57.

The spacing $A_{Si}$ of the bead inner edge 31a to the central longitudinal axis B of the containment can 10 is defined by the formula $\frac{1}{7}$*containment can inner radius$^Y$, wherein Y preferably lies in a range from approximately 1.14 to 1.17.

The containment can 10 is produced by deep drawing or by casting, wherein at least one bead 31 is produced in the base 26, which bead is arranged with a radial spacing to the central longitudinal axis B of the containment can 10. In the case of a containment can 10 produced by deep drawing, the beads 31 are stamped into the base 26 during the deep drawing process.

The beads 31, which are arranged with a radial spacing to the central longitudinal axis B of the containment can 10, extend in a radial direction to a point close to the rim region 30, or even extend as far as the latter.

Figure 4:
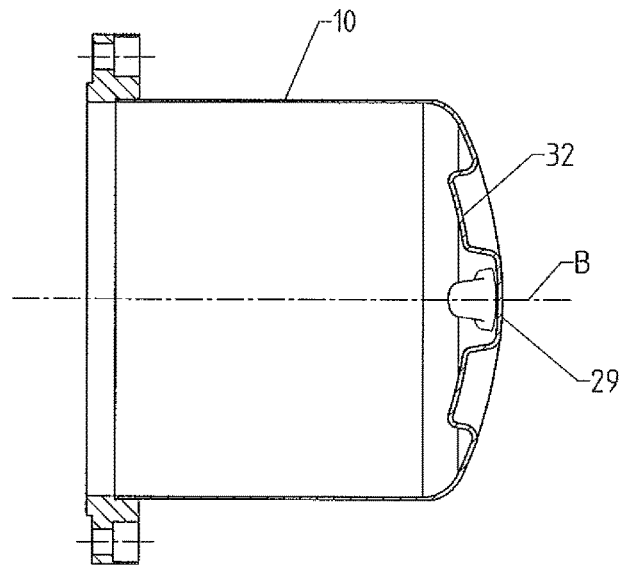
FIG. 4 shows the longitudinal section through the containment can according to a different embodiment of the invention.

As can be seen from FIG. 2, the bead base 32 runs in a plane which is situated substantially parallel to the plane which corresponds to the transition from the spherical cap region 29 to the rim region 30. In particular, the inner wall 34 of the containment can 10 in the region of the bead base 32 lies substantially in the same imaginary plane, perpendicular to the central longitudinal axis B, as the transition from the spherical cap region 29 to the rim region 30. Alternatively, as shown in FIG. 4, the bead base 32 of the containment can 10 may be formed so as to run parallel to the spherical cap region 29. Here, a part of the bead base 32 extends as far as a plane which runs perpendicular to the central longitudinal axis B and which lies in the rim region 30. As illustrated in FIG. 1, in the region of the bead base 32, the maximum spacing X of the inner wall 34 of the containment can 10 to a face side 35, facing toward the base 26 of the containment can 10, of the inner rotor 17 is approximately 20 mm. It is preferably the case that, in the region of the bead base 32, the maximum spacing X of the inner wall 34 of the containment can 10 to the face side 35 of the inner rotor 17 is approximately 10 mm.

The transitions between the spherical cap region 29 and the bead walls 33 have greater radii than the transitions from the bead walls 33 to the respective bead base 32.

Figure 5:
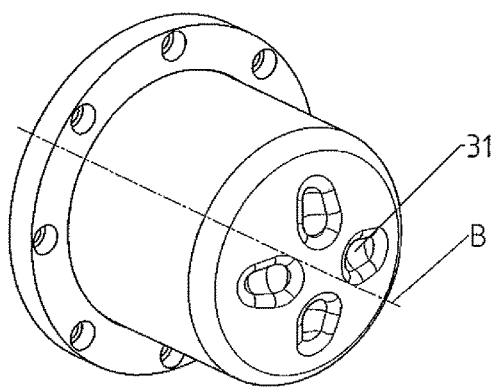
FIG. 5 is a three-dimensional illustration of the containment can according to a further embodiment of the invention.

The beads 31 illustrated in FIGS. 1 to 4 have a substantially stadium-shaped geometry. Alternatively, said beads may have any other desired geometry. The beads 31 may for example be of prism-shaped, cuboidal or spherical form or may be formed from similar truncated geometries or combinations thereof or may, as shown in FIG. 5, have a bead base 32 which is domed in the direction of the inner rotor.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE DESIGNATIONS

1 Pump arrangement
2 Casing
3 Hydraulics casing
4 Casing cover
5 Bearing carrier cage
6 Bearing carrier
7 Bearing cover
8 Inlet opening
9 Outlet opening
10 Containment can
11 Interior space
12 Chamber
13 Impeller shaft
13a Shaft section
13b Shaft section
14 Flow chamber
15 Opening
16 Impeller
17 Inner rotor
18 Magnet
19 Bearing arrangement
20 Drive shaft
21 Ball bearing
22 Ball bearing
23 Magnet
24 Outer rotor
25 Main body
26 Base
27 Attachment flange
28 Bore
29 Spherical cap region
30 Rim region
31 Bead
31a Bead inner edge
31b Bead outer edge
32 Bead base
33 Bead wall
34 Inner wall
35 Face side of the inner rotor
A Axis of rotation
B Central longitudinal axis
$r_{is}$ Inner radius $r_{is}$ of containment can
$A_{Sa}$ Spacing between bead outer edge and central longitudinal axis
$A_{Si}$ Spacing between bead inner edge and central longitudinal axis

The invention claimed is:

1. A pump arrangement, comprising:
a pump casing having an interior space;
a containment can having a central longitudinal axis and being arranged to hermetically seal a chamber in the interior space;
an impeller shaft;
an impeller arranged on an impeller end of the impeller shaft;
an inner rotor arranged within the containment can on an opposite end of the impeller shaft; and
an outer rotor arranged radially outside of the containment can and axially located to interact with the inner rotor,
wherein
the containment can has a base with at least one bead configured to project into the chamber,
a center region of the containment can base is unsupported along the central longitudinal axis on an impeller side of the containment can base,
the at least one bead is arranged away from the central longitudinal axis of the containment can with a spacing to the central longitudinal axis of the containment can such that a ratio of an inner radius of the containment can to a distance between a radially outer edge of the at least one bead to the central longitudinal axis of the containment can is between 1.3 to 1.6, and the base of the containment can includes a substantially spherical-segment-shaped cap region and a rim region arranged as a transition region between a main body of the containment can and spherical-segment-shaped cap region, the substantially spherical-segment-shaped cap region being continuously curved between one side of the rim region to a diametrically-opposite side of the rim region in regions away from the at least one bead.

2. The pump arrangement as claimed in claim 1, wherein the ratio of the inner radius of the containment can to the distance between the radially outer edge of the at least one bead to the central longitudinal axis of the containment can is between 1.38 to 1.57.

3. The pump arrangement as claimed in claim 2, wherein a spacing of an inner edge of the at least one bead to the central longitudinal axis of the containment can is $(1/7)*$(the container can inner radius)$^Y$, wherein Y is 1.14 to 1.17.

4. The pump arrangement as claimed in claim 1, wherein a spacing of an inner edge of the at least one bead to the central longitudinal axis of the containment can is $(1/7)*$(the container can inner radius)$^Y$, wherein Y is 1.14 to 1.17.

5. The pump arrangement as claimed in claim 1, wherein the at least one bead includes a bead base and bead walls, and the bead base is in a plane substantially parallel to a plane containing the transition region.

6. The pump arrangement as claimed in claim 5, wherein an inner wall of the containment can in the region of the bead base is in the plane containing the transition region.

7. The pump arrangement as claimed in claim 5, wherein a maximum spacing between the bead base and an end face of the inner rotor is 20 mm.

8. The pump arrangement as claimed in claim 7, wherein the maximum spacing is 10 mm.

9. The pump arrangement as claimed in claim 5, wherein transitions between the spherical cap region and the bead walls have greater radii than transitions from the bead walls to the bead base of the at least one bead.

10. The pump arrangement as claimed in claim 1, wherein the bead base is arranged parallel to a line corresponding to a shape of the spherical cap region in a portion of the spherical cap region adjacent to the bead base.

11. The pump arrangement as claimed in claim 1, wherein the at least one bead extends radially outward at least to the rim region.

* * * * *